United States Patent
Chen

(10) Patent No.: US 12,015,693 B2
(45) Date of Patent: Jun. 18, 2024

(54) INFORMATION SECURITY PROTECTION SYSTEM AND INFORMATION SECURITY PROTECTION METHOD

(71) Applicant: Nuvoton Technology Corporation, Hsinchu Science Park (TW)

(72) Inventor: Shun-Hsiung Chen, Hsinchu Science Park (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 184 days.

(21) Appl. No.: 17/564,286

(22) Filed: Dec. 29, 2021

(65) Prior Publication Data

US 2022/0407679 A1    Dec. 22, 2022

(30) Foreign Application Priority Data

Jun. 17, 2021    (TW) .................................. 110122037

(51) Int. Cl.
    *H04L 29/00*    (2006.01)
    *H04L 9/00*     (2022.01)
    *H04L 9/06*     (2006.01)
    *H04L 9/34*     (2006.01)

(52) U.S. Cl.
    CPC ............ *H04L 9/0631* (2013.01); *H04L 9/002* (2013.01); *H04L 9/34* (2013.01)

(58) Field of Classification Search
    CPC .......... H04L 9/0631; H04L 9/002; H04L 9/34
    USPC .......................................................... 380/28
    See application file for complete search history.

(56) References Cited

U.S. PATENT DOCUMENTS

| 8,261,062 | B2  |   | 9/2012 | Aura et al. |
| 2011/0231673 | A1 | * | 9/2011 | Alekseev ................ G06F 21/72  713/190 |
| 2021/0160052 | A1 | * | 5/2021 | Chalker ................ H04L 9/0668 |

FOREIGN PATENT DOCUMENTS

| CN | 102625939 B  | 2/2017 |
| CN | 112422272 A  | 2/2021 |
| EP | 3525126 A1   | 8/2019 |
| TW | I584152 B    | 5/2017 |
| TW | I690165 B    | 4/2020 |
| TW | I727551 B    | 5/2021 |

OTHER PUBLICATIONS

Office Action of TW Application No. 110122036, dated Jan. 4, 2022, 1 page.

(Continued)

*Primary Examiner* — Jeffrey C Pwu
*Assistant Examiner* — Michael D Anderson
(74) *Attorney, Agent, or Firm* — MUNCY, GEISSLER, OLDS & LOWE, P.C.

(57) ABSTRACT

An information security protection method includes: repeatedly substituting a plaintext into an encryption algorithm to obtain a plurality of ciphertexts, and determining whether the ciphertexts are all the same h the processor core. Each time the processor core substitutes the plaintext into the encryption algorithm, the encryption algorithm outputs a ciphertext. When the processor core determines that the ciphertexts are not all the same, the processor core outputs a hacker attack message, which means that an encryption process has suffered a hacker attack.

8 Claims, 4 Drawing Sheets

(56) References Cited

OTHER PUBLICATIONS

Office Action mailed Sep. 21, 2022 in TW Application No. 110122037, 12 pages.
Office Action dated May 3, 2023 issued in corresponding Taiwan Application No. 110122036, 6 pages.

* cited by examiner

INFORMATION SECURITY PROTECTION SYSTEM AND INFORMATION SECURITY PROTECTION METHOD

CROSS REFERENCE TO RELATED APPLICATIONS

This Application claims priority of Taiwan Patent Application No. 110122037, filed on Jun. 17, 2021, the entirety of which is incorporated by reference herein. This application is related to Applicant's co-pending U.S. patent application Ser. No. 17/564,528, filed on Dec. 29, 2021, the entirety of which is incorporated by reference herein.

BACKGROUND OF THE INVENTION

Field of the Invention

The present disclosure relates to an information security protection system and an information security protection method, and in particular, to an information security protection system and an information security protection method for avoiding voltage glitch attacks.

Description of the Related Art

In the field of information security, a voltage glitch attack quickly changes the voltage input to a chip, so that some transistors in the chip are affected, causing one or more output values to be wrong. As a result, the processor will skip or operate incorrectly, and therefore the information hidden in the chip will leak out with the error of the processor.

Therefore, how to detect and avoid voltage glitch attacks has become one of the problems to be solved in this field.

BRIEF SUMMARY OF THE INVENTION

In accordance with one feature of the present invention, the present disclosure provides an information security protection system. The information security protection system includes a processor core. The processor core is configured to repeatedly substitute a plaintext into an encryption algorithm to obtain a plurality of ciphertexts, and to determine whether the ciphertexts are all the same. Each time the processor core substitutes the plaintext into the encryption algorithm, the encryption algorithm outputs a ciphertext. When the processor core determines that the ciphertexts are not all the same, the processor core outputs a hacker attack message, which means that an encryption process has suffered a hacker attack.

In one embodiment, the number of times that the processor core repeatedly substitutes the plaintext into the encryption algorithm is greater than or equal to two; when the processor core determines that the ciphertexts are all the same, the processor core outputs a normal operation message, the normal operation message represents the normal operation of the encryption process.

In one embodiment, the encryption algorithm is an Advanced Encryption Standard (AES) algorithm, and the processor core adds at least one idle cycle before the last column mixing operation (MixColums) of the encryption algorithm.

In one embodiment, wherein the encryption algorithm is an advanced encryption standard algorithm, and the processor core inserts at least one idle period between a first round operation to a second round operation of the encryption algorithm; wherein each of the first round operation and the second round operation sequentially includes a byte substitution operation (SubBytes), a row shift operation (Shift-Rows), a column mixing operation, and an add round key operation (AddRoundKey).

In one embodiment, the encryption algorithm is an advanced encryption standard algorithm; the processor core obtains a temporary result after calculating the encryption algorithm from a first round operation to a second round operation, and stores the temporary result in a storage device; after waiting for at least one idle period, the temporary result is retrieved from the storage device, and the temporary result is input to a third round calculation.

In accordance with one feature of the present invention, the present disclosure provides an information security protection method. The information security protection method includes: repeatedly substituting a plaintext into an encryption algorithm to obtain a plurality of ciphertexts. And, the processor core determines whether the ciphertexts are all the same. Each time the processor core substitutes the plaintext into the encryption algorithm, the encryption algorithm outputs a ciphertext. When the processor core determines that the ciphertexts are not all the same, the processor core outputs a hacker attack message, which means that an encryption process has suffered a hacker attack.

In one embodiment, the number of times that the processor core repeatedly substitutes the plaintext into the encryption algorithm is greater than or equal to two; when the processor core determines that the ciphertexts are all the same, the processor core outputs a normal operation message, the normal operation message represents the normal operation of the encryption process.

In one embodiment, the encryption algorithm is an Advanced Encryption Standard (AES) algorithm, and the processor core adds at least one idle cycle before the last column mixing operation (MixColums) of the encryption algorithm.

In one embodiment, the encryption algorithm is an advanced encryption standard algorithm, and the processor core inserts at least one idle period between a first round operation to a second round operation of the encryption algorithm; and each of the first round operation and the second round operation sequentially includes a byte substitution operation (SubBytes), a row shift operation (Shift-Rows), a column mixing operation, and an add round key operation (AddRoundKey).

In one embodiment, the encryption algorithm is an advanced encryption standard algorithm, the information security protection method further includes: obtaining a temporary result after calculating the encryption algorithm from a first round operation to a second round operation, and storing the temporary result in a storage device by the processor core; after waiting for at least one idle period, retrieving the temporary result from the storage device, and inputting the temporary result to a third round calculation.

It can be seen from the above that with the information security protection system and information security protection method of the application, by determining whether the ciphertexts that after encrypting the same plaintext with the same encryption method multiple times are consistent, the information security protection system can make the information security protection system self-determine whether the encryption process has been attacked by hacker. Also, by inserting idle periods between different rounds of calculations or before the last column mixing operation, the time for each round of encryption is not fixed. It can make it difficult for hackers to predict the execution time of the last column mixing operation. This can greatly reduce the possibility of the voltage glitch attack method being successful, making it more difficult for hackers to obtain the encryption key, thereby achieving the effect of encrypting data in a more secure way.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
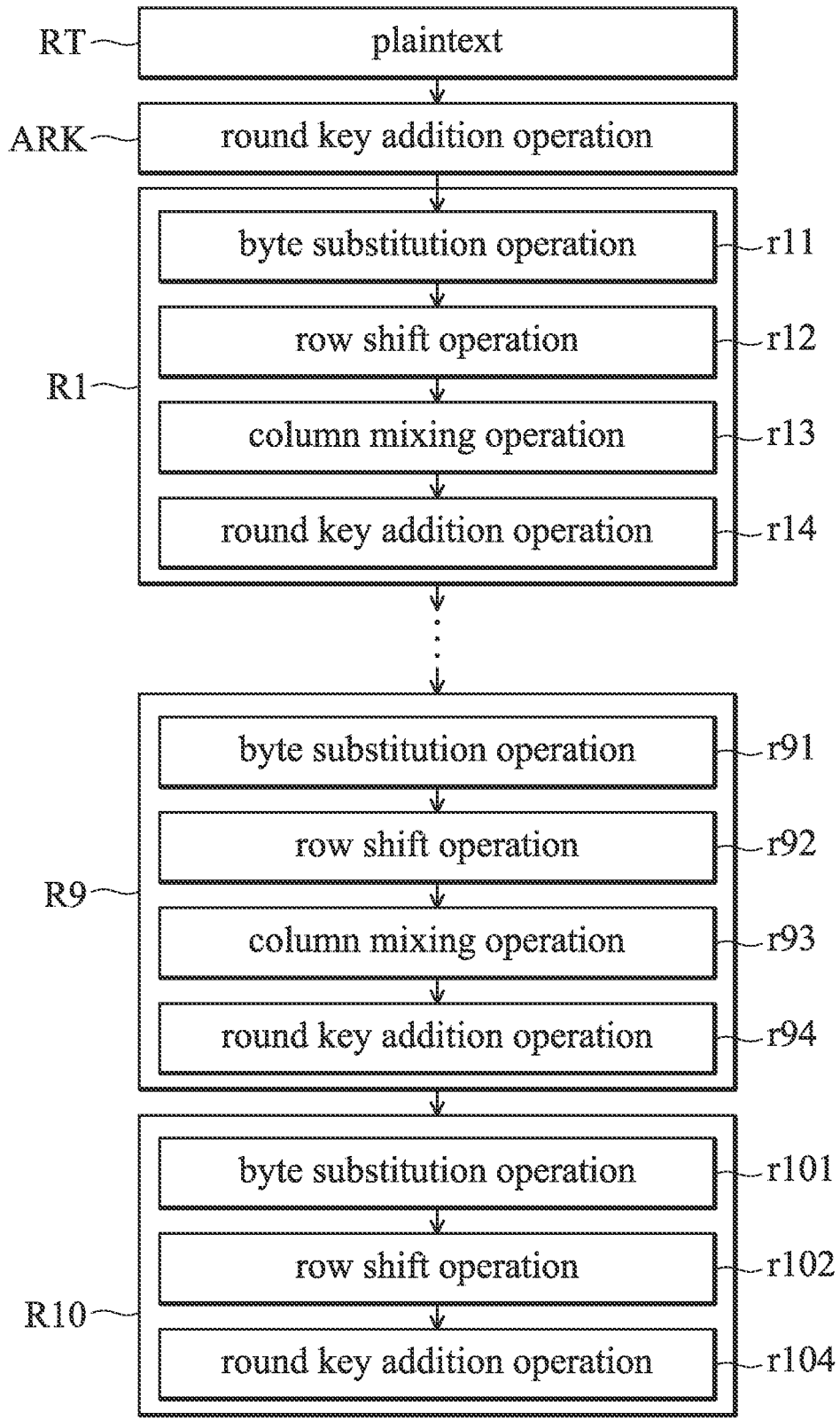
FIG. 1 is a schematic diagram of an encryption part of an advanced encryption standard algorithm in accordance with one embodiment of the present disclosure.

Refer to FIG. 1, FIG. 1 is a schematic diagram of an encryption part of an advanced encryption standard algorithm in accordance with one embodiment of the present disclosure.

In one embodiment, the Advanced Encryption Standard (AES) algorithm is an algorithm that is analyzed by multiple parties and is widely used. Therefore, the following briefly describes the encryption part of the AES algorithm.

Taking FIG. 1 as an example, the information security protection system inputs the plaintext RT into the AES algorithm for encryption. In some examples, the plaintext RT is one or more 128 bits. Then, the round key addition operation (AddRoundKey) ARK is entered. In this example, there will be 10 round operations R1-R10. In other words, the data generated by the round key addition operation ARK will be substituted into the first round operation R1, the output of the first round operation R1 will be substituted into the second round operation R2, and so on. Until the output of the 9th round operation R9 is substituted into the 10th round operation R10, the encryption is completed.

The first to ninth round operations R1 to R9 all include a byte substitution operation (SubBytes), a row shift operation (ShiftRows), a column mixing operation (MixColums), and a round of key addition operation (AddRoundKey). The calculation is a part of the AES algorithm, so there is not much explanation about the content of each calculation here. The column mixing operation is a nonlinear algorithm, and the other algorithms are the basic operations of applied mathematical mapping.

For example, the first round operation R1 includes byte substitution operation r11, row shift operation r12, column mixing operation r13, and round key addition operation r14. The ninth round operation R9 includes byte substitution operation r91, row shift operation r92, column mixing operation r93, and round key addition operation r94. The tenth round operation R10 includes byte substitution operation r101, row shift operation r102, and round key addition operation r104. In the following embodiments, 10 round operations R1 to R10 are taken as an example. Those skilled in the art should understand that the number of round operations is not limited thereto.

Since the case is aimed at determining whether the encryption process has been maliciously attacked and avoiding the theft of the key, and does not involve the decryption process, the decryption process is not discussed here. However, the decryption method in this case can still be decrypted according to the decryption steps of the AES algorithm.

However, in the encryption step of the AES algorithm, there are loopholes in which the key can be obtained by hackers. For example, a hacker can perform a series of mathematical deductions through voltage glitch attacks to obtain the key for encryption. The following FIGS. 2 to 3 explain the voltage glitch attack method.

Figure 2:
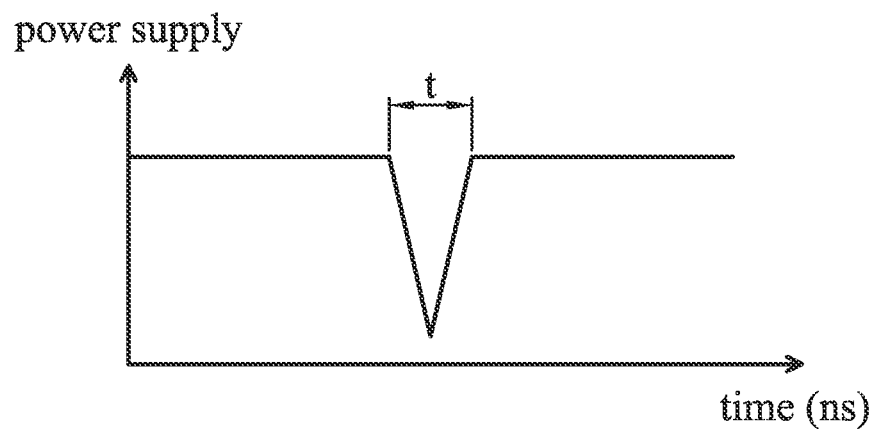
FIG. 2 is a schematic diagram illustrating a power supply state of a voltage glitch attack method in accordance with one embodiment of the present disclosure.
Figure 3:
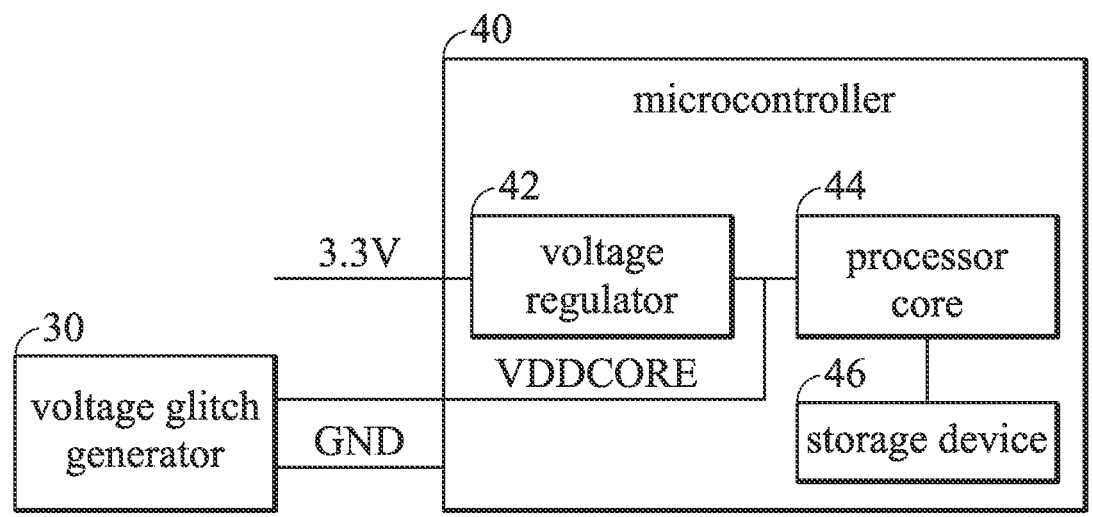
FIG. 3 is a schematic diagram of a voltage glitch attack method in accordance with one embodiment of the present disclosure.

Please refer to FIGS. 2 to 3. FIG. 2 is a schematic diagram illustrating a power supply state of a voltage glitch attack method in accordance with one embodiment of the present disclosure. FIG. 3 is a schematic diagram of a voltage glitch attack method in accordance with one embodiment of the present disclosure.

As shown in FIG. 3, the processor core 44 in the microcontroller 40 can be coupled to a storage device 46, such as a memory of the processor core or a register of the processor core. The processor core 44 can store the encrypted data in the storage device 46, and the processor core 44 can also store the half-time temporary result of the operation in the storage device 46.

In the example in FIG. 3, when a hacker wants to attack the encrypted data stored in the microcontroller 40, the hacker will connect the voltage glitch generator 30 to the processor core 44 in the microcontroller 40. The line VDD- CORE represents the voltage supplied to the processor core 44. The line GND represents ground. In addition, an external voltage of 3.3 volts is provided to the voltage regulator 42. The voltage regulator 42 is used to output a stable voltage to the processor core 44.

As shown in FIG. 2, the horizontal axis is time (units are nanoseconds, nanosecond (ns)), and the vertical axis is power supply (units can be volts). The voltage glitch generator 30 can generate a voltage glitch in a short time interval t (for example, 2 ns), and transmit it to the processor core 44 via the line VDDCORE. For example, the voltage glitch generator 30 quickly pulls down the voltage and immediately returns to the normal voltage.

As shown in FIG. 3, since each logic gate or element has a fixed operating voltage during operation, if the operating voltage is destroyed (for example, the operating voltage is destroyed by a voltage glitch), the operation of the logic gate or element will be incorrect. For example, after a voltage glitch temporarily destroys the operating voltage of the processor core 44, it will cause the processor core 44 to make an operation error.

If the voltage glitch occurs before the last column mixing operation, it will cause a 1-byte error. The 1-byte error will spread into 4-byte errors after the column mixing operation, which is regarded as a slightly different error in the overall operation value.

For example, when the hacker knows the correct plaintext and ciphertext, the voltage glitch occurs before the column mixing operation r93 in the 9th round operation R9. More precisely, the voltage glitch occurs between the row shift operation r92 and the column mixing operation r93 in the 9th round operation R9, which will cause a 1-byte error. The 1-byte error will spread into a 4-byte error after the column mixing operation r93 is completed. The 4-byte error is regarded as a partial error in the overall 128 bit. Therefore, the hacker obtained a set of slightly wrong ciphertexts.

Since hackers may not be able to accurately issue voltage glitches at the time point between row shift operation r92 and column mixing operation r93, the normal hacker will try to find the time point between the row shift operation r92 and the column mixing operation r93 in the 9th round operation R9 many times (for example, dozens of times) (that is, before the last column mixing operation r93), to make voltage glitch generator 30 generates voltage glitches to obtain multiple groups of slightly wrong ciphertexts. Ciphertexts with slight errors are decomposed into the simultaneous equation to obtain the sub-key used in the 9th round operation R9. This sub-key can be used for inverse operation to obtain the original key; That is, the security of the AES algorithm is cracked.

The above-mentioned voltage glitch attack method is a known attack method used by hackers, so the details are not repeated here. The following describes the method of detecting voltage glitch attack and the method of avoiding voltage glitch attack.

Figure 4:
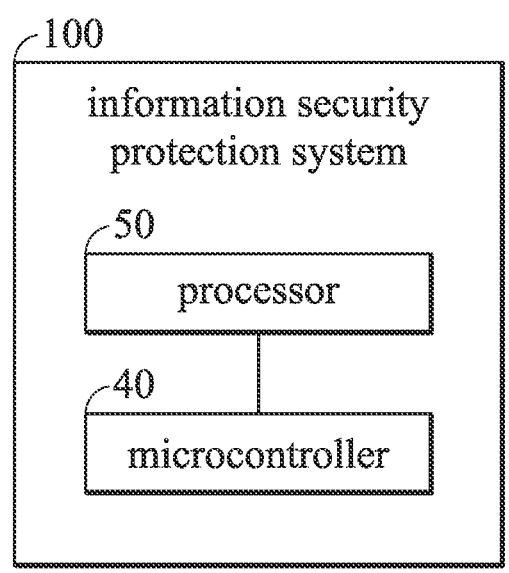
FIG. 4 is a schematic diagram illustrating an information security protection system in accordance with one embodiment of the present disclosure.
Figure 5:
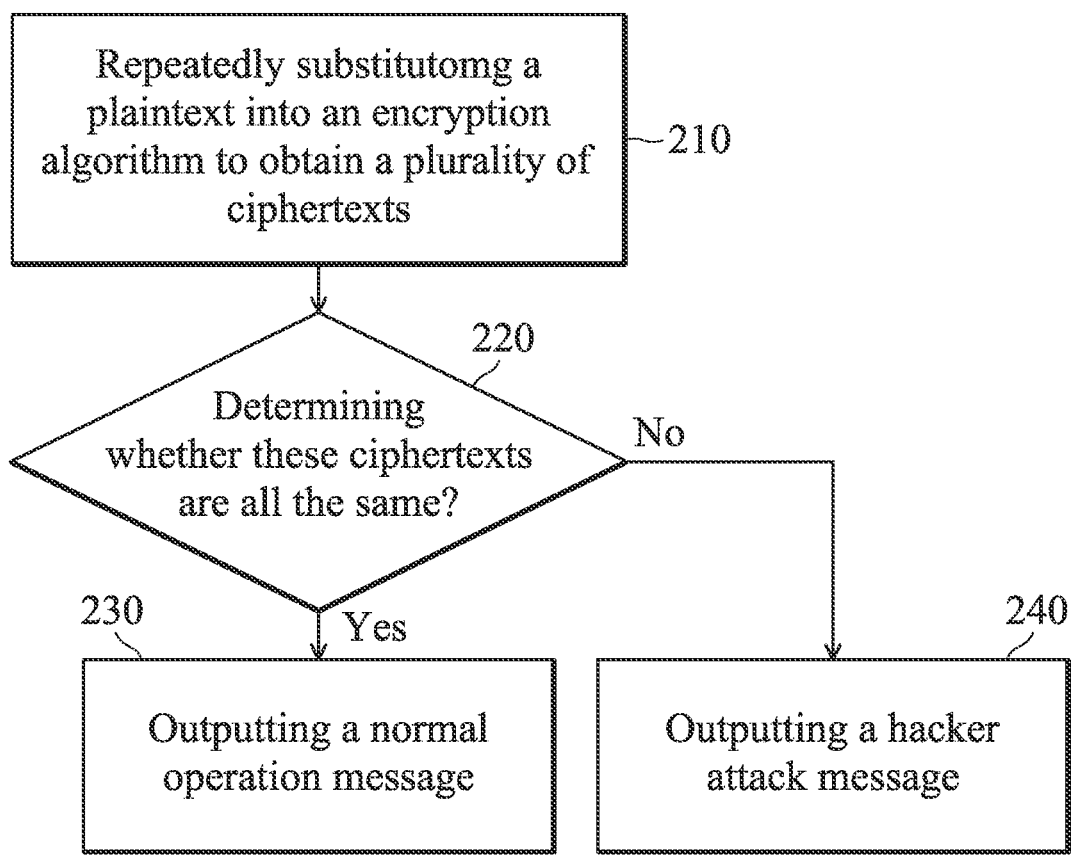
FIG. 5 is a schematic diagram illustrating an information security protection method 200 in accordance with one embodiment of the present disclosure.

Please refer to FIGS. 4 to 5. FIG. 4 is a schematic diagram illustrating an information security protection system 100 in accordance with one embodiment of the present disclosure. FIG. 5 is a schematic diagram illustrating an information security protection method 200 in accordance with one embodiment of the present disclosure. The information security protection system 100 includes a processor core 44. In one embodiment, the information security protection system 100 further includes a microcontroller 40. In one embodiment, the information security protection system 100 further includes a local processor 50. In one embodiment, the information security protection system 100 further includes other electronic components, such as chips, devices, circuits, etc. In an embodiment, the information security protection method 200 can be implemented by the information security protection system 100. In an embodiment, the information security protection method 200 can be executed by a processor external to the microcontroller 40.

In the following example, the component to be protected is the microcontroller 40, and the microcontroller 40 includes a processor core 44 and a storage device 46. In one embodiment, when the device to be protected (for example, a chip with only circuits) does not have the processor core 44, the information security protection method 200 can be executed by the processor 50 of the local machine.

In step 210, the processor core 44 is configured to repeatedly substitute a plaintext into an encryption algorithm to obtain a plurality of ciphertexts.

In one implementation, the plaintext can be cut into multiple 126-bit blocks, and then input into the encryption algorithm. The encryption algorithm can use a known algorithm, such as the AES algorithm. In one embodiment, an AES engine may be included inside or outside the processor core 44 to perform encryption and decryption operations.

In step 220, the processor core 44 determines whether these ciphertexts are all the same. Each time the processor substitutes the plaintext into the encryption algorithm, the encryption algorithm outputs a ciphertext. If the processor core 44 determines that these ciphertexts are the same, step 230 is performed. If the processor core 44 determines that these ciphertexts are not all the same, step 240 is performed.

In one embodiment, the number of times that the processor core 44 repeatedly substitutes the plaintext into the encryption algorithm is greater than or equal to two times. For example, the processor core 44 repeatedly substitutes the plaintext into the encryption algorithm 50 times.

In step 230, the processor core 44 outputs a normal operation message, and the normal operation message represents the normal operation of encryption process.

In one embodiment, the processor core 44 outputs a normal operation message to the processor 50 of the host.

In step 240, the processor core 44 outputs a hacker attack message, and the hacker attack message means that encryption process has suffered a hacker attack.

In one embodiment, the processor core 44 outputs a normal operation message to the processor 50 of the host, and the processor 50 of the host displays the information that the encryption process has been hacked on a display.

With the application of the information security protection method 200, the information security protection system 100 can make self-determination whether the encryption process is attacked by hackers.

In one embodiment, the processor core 44 adds at least one idle cycle before the last column mixing operation of the encryption algorithm. For example, the processor core 44 adds at least one idle period before the column mixing operation r93 in the 9th round operation R9.

Since hackers would like to cause voltage glitches to occur between the row shift operation r92 and column mixing operation r93 in the 9th round operation R9, for example, the hacker predicts that the row shift operation r92 will be executed at the 140th to the 149th nanosecond after the plaintext is entered, and the column mixing operation r93 will be executed after the 150th nanosecond. The hacker will hope to trigger the voltage glitch at 140th to 149th nanosecond. However, if at least one idle period (for example, 60 nanoseconds) is added between the row shift operation r92 and the column mixing operation r93 in the 9th round operation R9, it will be executed at the 200th to the 209th nanosecond after the plaintext is input row shift operation r92, and column mixing operation r93 is executed after the 210th nanosecond. At this time, because the hacker does not know that the time to execute the column mixing operation r93 had changed, as such, even if the hacker successfully triggers the voltage glitch at the 140th to the 149th nanosecond, it will still not affect the column mixing operation r93 that is executed after the 210th nanosecond. In other words, it can prevent hackers from accurately finding the time point when the last column mixing operation r93 is executed, which greatly reduces the probability of the column mixing operation r93 being affected by the operation.

In one embodiment, the encryption algorithm is an AES algorithm, and the processor core 44 inserts at least one idle period in between performing a first round operation (for example, the second round operation R2) of the encryption algorithm and a second round operation (the third round operation R3) of the encryption algorithm, and then performing subsequent operations in sequence after the second round of operations.

Since hackers hope that the voltage glitch occurs between the row shift operation r92 and the column mixing operation r93 in the 9th round operation R9, for example, the hacker predicts that the row shift operation r92 will be executed at the 140th to the 149th nanosecond after the plaintext is entered, and the column mixing operation r93 will be executed after the 150th nanosecond. The hacker will hope to trigger the voltage glitch at the 140th to the 149th nanosecond. However, if at least one idle period (for example, 70 nanoseconds) is added between the second round operation R2 and the third round operation R3, the row shift operation r92 will be executed at 210th to 219th nanosecond after the plaintext is input. Column mixing operation r93 is performed after the 220th nanosecond. At this time, because the hacker does not know that the time to execute the column mixing operation r93 had changed, therefore, even if the hacker succeeds in triggering the voltage glitch at the 140th to the 149th nanosecond, it will still not affect the column mixing operation r93 that is executed after the 220th nanosecond. In other words, this can prevent hackers from accurately finding the time point when the last column mixing operation r93 is executed, which greatly reduces the probability of the column mixing operation r93 being affected by the operation.

In one embodiment, the encryption algorithm is an AES algorithm, and the processor core 44 inserts at least one idle period in between performing a first round operation (for example, the first round operation R1) of the encryption algorithm and a second round operation (the fifth round operation R5) of the encryption algorithm, and a temporary result is obtained. The temporary result is stored in the storage device 40, and a temporary result is obtained, the temporary result is stored in the storage device 40. After waiting for at least one idle period (for example, 100 nanoseconds), the temporary result is retrieved from the storage device 40, and the temporary result is input to a third round of calculation (for example, the sixth round of calculation R6).

Since hackers would hope that the voltage glitch occurs between the row shift operation r92 and the column mixing operation r93 in the 9th round operation R9, for example, hackers predict that row shift operation r92 will be executed at the 140th to the 149th nanosecond after the plaintext is entered, and column mixing operation r93 will be executed after the 150th nanosecond. Hackers will hope to trigger a voltage glitch at the 140th to the 149th nanosecond. However, if after the processor core 44 executes the first round operation R1 to the fifth round operation R5, the temporary result of the fifth round operation R5 is stored in the storage device 40, after waiting for at least one idle period (for example, 100 nanoseconds), the temporary result is retrieved from the storage device 40, and the temporary result is input to the sixth round operation R6. It is estimated that the row shift operation r92 will be executed at the 240th to the 249th nanosecond after the plaintext is input, and the column mixing operation r93 will be executed after the 250th nanosecond. At this time, because the hacker does not know that the time to execute the column mixing operation r93 had changed, therefore, even if the hacker succeeds in triggering the voltage glitch at the 140th to the 149th nanosecond, it will still not affect the column mixing operation r93 that is executed after the 220th nanosecond. In other words, this allows hackers to be unable to accurately find the time point of the last column mixing operation r93, which greatly reduces the probability of the column mixing operation r93 being affected.

By inserting idle cycles between different rounds of operations or before the last column mixing operation, it is difficult for hackers to predict the execution time of the last column mixing operation. This greatly reduces the probability of incorrect calculation results in the final output.

It can be seen from the above that with the information security protection system and information security protection method of the application, by determining whether the ciphertexts that after encrypting the same plaintext with the same encryption method multiple times are consistent, the information security protection system can make the information security protection system self-determine whether the encryption process has been attacked by hacker. Also, by inserting idle periods between different rounds of calculations or before the last column mixing operation, the time for each round of encryption is not fixed. It can make it difficult for hackers to predict the execution time of the last column mixing operation. This can greatly reduce the possibility of the voltage glitch attack method being successful, making it more difficult for hackers to obtain the encryption key, thereby achieving the effect of encrypting data in a more secure way.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An information security protection system, comprising:
 a processor core, configured to repeatedly substitute a plaintext into an encryption algorithm to obtain a plurality of ciphertexts, and to determine whether the ciphertexts are all the same; wherein each time the processor core substitutes the plaintext into the encryption algorithm, the encryption algorithm outputs a ciphertext;
 wherein when the processor core determines that the ciphertexts are not all the same, the processor core outputs a hacker attack message, which means that an encryption process has suffered a hacker attack;

wherein the number of times that the processor core repeatedly substitutes the plaintext into the encryption algorithm is greater than or equal to two;

when the processor core determines that the ciphertexts are all the same, the processor core outputs a normal operation message, and the normal operation message represents the normal operation of the encryption process.

2. The information security protection system of claim 1, wherein the encryption algorithm is an Advanced Encryption Standard (AES) algorithm, and the processor core adds at least one idle cycle before the last column mixing operation (MixColums) of the encryption algorithm.

3. The information security protection system of claim 1, wherein the encryption algorithm is an advanced encryption standard algorithm, and the processor core inserts at least one idle period between a first round operation and a second round operation of the encryption algorithm;

wherein each of the first round operation and the second round operation sequentially includes a byte substitution operation (SubBytes), a row shift operation (ShiftRows), a column mixing operation, and an add round key operation (AddRoundKey).

4. The information security protection system of claim 1, wherein the encryption algorithm is an advanced encryption standard algorithm;

the processor core obtains a temporary result after calculating the encryption algorithm from a first round operation to a second round operation, and stores the temporary result in a storage device;

after waiting for at least one idle period, the temporary result is retrieved from the storage device, and the temporary result is input to a third round calculation.

5. An information security protection method, comprising:

repeatedly substituting a plaintext into an encryption algorithm to obtain a plurality of ciphertexts and using the processor core to determine whether the ciphertexts are all the same; wherein each time the processor core substitutes the plaintext into the encryption algorithm, the encryption algorithm outputs a ciphertext;

wherein when the processor core determines that the ciphertexts are not all the same, the processor core outputs a hacker attack message, which means that an encryption process has suffered a hacker attack;

wherein the number of times that the processor core repeatedly substitutes the plaintext into the encryption algorithm is greater than or equal to two; and when the processor core determines that the ciphertexts are all the same, the processor core outputs a normal operation message, and the normal operation message represents the normal operation of the encryption process.

6. The information security protection method of claim 5, wherein the encryption algorithm is an Advanced Encryption Standard (AES) algorithm, and the processor core adds at least one idle cycle before the last column mixing operation (MixColums) of the encryption algorithm.

7. The information security protection method of claim 5, wherein the encryption algorithm is an advanced encryption standard algorithm, and the processor core inserts at least one idle period between a first round operation and a second round operation of the encryption algorithm;

wherein each of the first round operation and the second round operation sequentially includes a byte substitution operation (SubBytes), a row shift operation (ShiftRows), a column mixing operation, and an add round key operation (AddRoundKey).

8. The information security protection method of claim 5, wherein the encryption algorithm is an advanced encryption standard algorithm, the information security protection method further comprising:

obtaining a temporary result after calculating the encryption algorithm from a first round operation to a second round operation;

wherein the processor core stores the temporary result in a storage device;

after waiting for at least one idle period, retrieving the temporary result from the storage device, and inputting the temporary result to a third round calculation.

* * * * *